(12) United States Patent
Yoo

(10) Patent No.: US 8,170,104 B2
(45) Date of Patent: May 1, 2012

(54) APPARATUS AND METHOD FOR MOTION VECTOR PREDICTION

(75) Inventor: Ki-won Yoo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2032 days.

(21) Appl. No.: 10/923,030

(22) Filed: Aug. 23, 2004

(65) Prior Publication Data

US 2005/0100097 A1    May 12, 2005

(51) Int. Cl.
H04N 7/12    (2006.01)
H04N 11/02   (2006.01)
H04N 11/04   (2006.01)

(52) U.S. Cl. .................................. 375/240.16
(58) Field of Classification Search .............. 375/240.16
See application file for complete search history.

(56) References Cited

U.S. PATENT DOCUMENTS

| | | | | |
|---|---|---|---|---|
| 5,111,292 | A * | 5/1992 | Kuriacose et al. | 375/240.01 |
| 6,348,954 | B1 * | 2/2002 | Takishima et al. | 348/699 |
| 7,181,070 | B2 * | 2/2007 | Petrescu et al. | 382/236 |
| 2004/0013309 | A1 * | 1/2004 | Choi et al. | 382/238 |
| 2004/0028282 | A1 * | 2/2004 | Kato et al. | 382/236 |
| 2004/0190616 | A1 * | 9/2004 | Linzer et al. | 375/240.16 |
| 2004/0252768 | A1 * | 12/2004 | Suzuki et al. | 375/240.24 |

FOREIGN PATENT DOCUMENTS

| | | |
|---|---|---|
| JP | 2000-175199 | 6/2000 |
| JP | 2000-184380 | 6/2000 |
| KR | 10-1999-0069287 | 9/1988 |
| KR | 10-2000-0018487 | 4/2000 |
| KR | 10-45132 A | 6/2001 |
| KR | 2001-0076707 | 8/2001 |
| KR | 2002-54210 | 7/2002 |
| KR | 2003-55479 | 7/2003 |
| KR | 2003-62341 | 7/2003 |

OTHER PUBLICATIONS

Korean Notice of Allowance dated May 28, 2008, of related KR 10-2003-00179163.

* cited by examiner

Primary Examiner — Andy S. Rao
Assistant Examiner — Jeremaiah Hallenbeck-Huber
(74) Attorney, Agent, or Firm — Staas & Halsey LLP

(57) ABSTRACT

A motion vector predicting method and apparatus for predicting motion vectors in image coding and decoding, including predicting a motion vector of each small block in a macro block divided into at least one small block. The method may include selecting at least one small block, where a motion vector can be estimated, using motion vector information of adjacent small blocks, and includes simultaneously performing a motion vector prediction of the selected small block. By reducing a 16-operation process, conventionally required for processing a macro block with 4×4 blocks, into an 11-operation process, the image coding and decoding processing times can be reduced without using a complicated motion vector predicting apparatus.

18 Claims, 4 Drawing Sheets

FIG. 3A

| D | B | X | X |
|---|---|---|---|
| A | T | X | X |
| X | X | X | X |
| X | X | X | X |

FIG. 3B

| 0 | D | B | C |
|---|---|---|---|
| 2 | A | T | X |
| X | X | X | X |
| X | X | X | X |

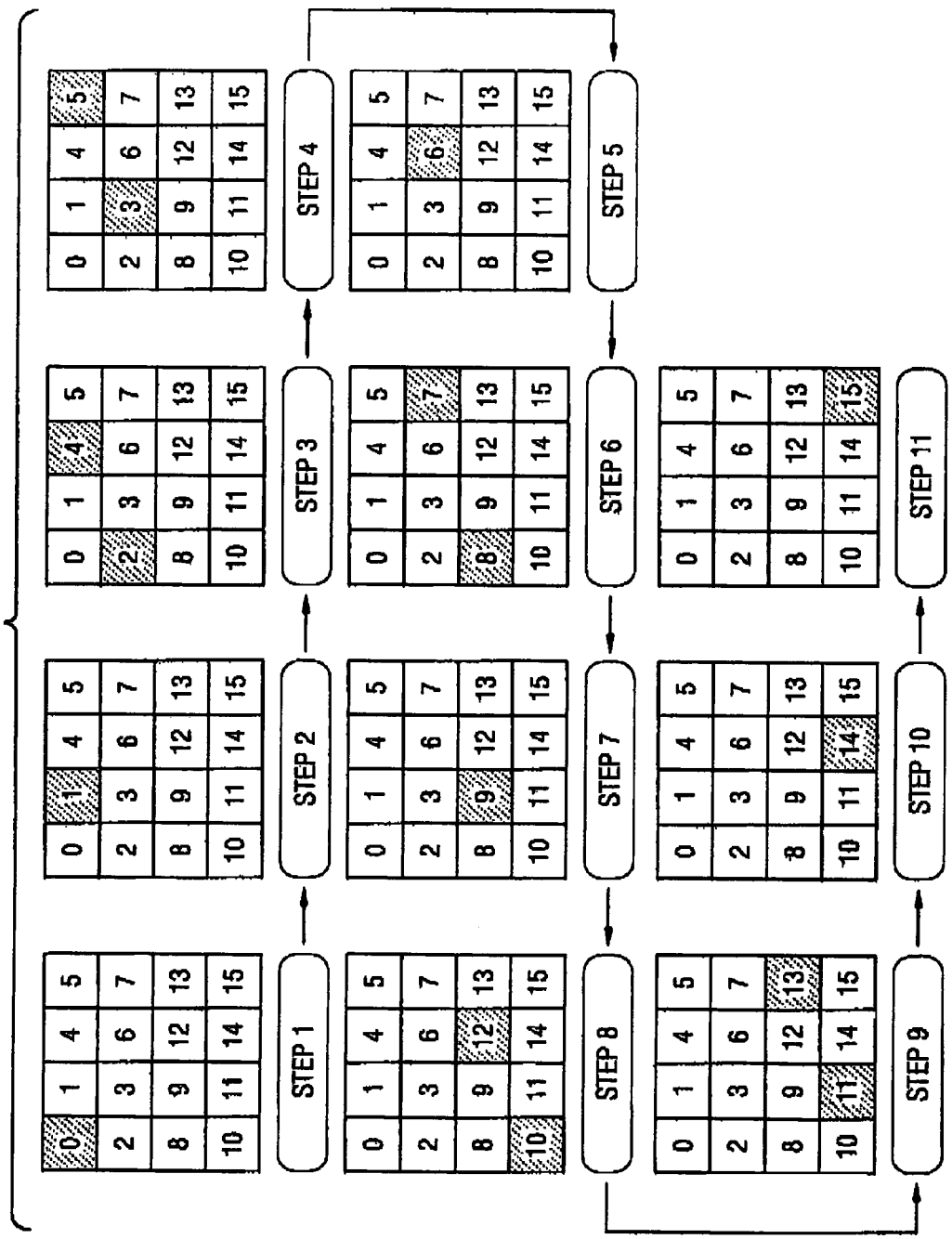

APPARATUS AND METHOD FOR MOTION VECTOR PREDICTION

CROSS-REFERENCE TO RELATED APPLICATIONS

This application claims the priority benefit of Korean Patent Application No. 2003-79163, filed on Nov. 10, 2003, in the Korean Intellectual Property Office, the disclosure of which is incorporated herein in its entirety by reference.

BACKGROUND OF THE INVENTION

1. Field of the Invention

The present invention relates to video coding and decoding, and more particularly, to an apparatus and method for predicting a motion vector when video coding or decoding is performed.

2. Description of the Related Art

According to an H.264 video compression standard for encoding and decoding moving picture data, various sized blocks are used to calculate a motion vector. Also, motion vector information of adjacent blocks is used to calculate a motion vector of a block.

Among the various sized blocks, there is a 16×16 macro block divided into 16 4×4 blocks. Here, to obtain motion vectors of the 4×4 blocks, a 16-operation sequential calculation process is necessary. Accordingly, it takes a great amount of time to calculate the motion vectors. However, as disclosed below, since a motion vector of a certain block can be simultaneously calculated with a motion vector of another block, if a motion vector of a block adjacent to a desired block is known already, the conventionally required 16 operations for calculating a motion vector can be reduced.

SUMMARY OF THE INVENTION

Embodiments of the present invention are directed toward an apparatus and method for predicting a motion vector, where the calculation operations for obtaining a motion vector of a 4×4 block is reduced.

Additional aspects and/or advantages of the invention will be set forth in part in the description which follows and, in part, will be obvious from the description, or may be learned by practice of the invention.

To achieve the above and/or additional aspects and advantages, embodiments of the present invention include a motion vector predicting method predicting a motion vector, in a macro block divided into plural blocks, including selecting at least one small block from the macro block which a motion vector can be estimated using motion vector information of at least one adjacent decoded small block, and simultaneously performing a motion vector prediction of the selected at least one small block with another small block from the macro block.

The at least one small block may be selected from the macro block in a zigzag scanning sequence from a left-upper position of the macro block to a right-lower position of the macro block. The motion vector prediction of the at least one small block may also be a motion prediction operation of an inter prediction mode.

In addition, the at least one small block may be a 4×4 block. The at least one small block may also be selected from the macro block in a zigzag scanning sequence from a left-upper position of the macro block to a right-lower position of the macro block.

To achieve the above and/or additional aspects and advantages, embodiments of the present invention include a motion vector predicting method for predicting a motion vector of each 4×4 block in a macro block, made up of 4×4 blocks, including simultaneously performing motion vector prediction of 4×4 blocks of the macro block, when numbering of the 4×4 blocks is performed by starting with a 0 numbered 4×4 block in a left-upper position of the macro block to a right-lower position of the macro block, with a 2 numbered 4×4 block and a 4 numbered 4×4 block, a 3 numbered 4×4 block and a 5 numbered 4×4 block, a 7 numbered 4×4 block and an 8 numbered 4×4 block, a 10 numbered 4×4 block and a 12 numbered 4×4 block, and an 11 numbered 4×4 block and a 13 numbered 4×4 block.

To achieve the above and/or additional aspects and advantages, embodiments of the present invention include a motion vector predicting apparatus predicting a motion vector, in a macro block divided into plural blocks, including a motion vector information receiver to receive sequence number information of at least one small block of the macro block and motion vector information of at least one adjacent small block, a comparator to determine whether the small block is a small block that can be simultaneously processed with another small block of the macro block, and to control the motion vector information receiver to further receive adjacent small block motion vector information for the another small block, a first processing unit to perform motion vector prediction of the small block, and a second processing unit to simultaneously perform motion vector prediction of the other small block with the performing of motion vector prediction by the first processing unit.

The motion vector prediction apparatus may further include a memory to store predicted motion vector prediction values of small blocks of the macro block and to output the stored predicted motion vector prediction values after motion vector prediction of all small blocks of the macro block is completed.

Further, the motion vector information receiver may divide the macro block into predetermined sized small blocks, assigns a sequencing identifier to each of the predetermined sized small blocks, starting with an initial identifier, in a direction from a left-upper position of the macro block to a right-lower position of the macro block, and sequentially receives the predetermined sized small blocks based on corresponding sequencing identifiers.

The small block may be a 4×4 block. Similarly, the motion vector information receiver may divide the macro block into 16 4×4 blocks, assign sequencing identifiers to 16 4×4 blocks, starting with an initial identifier, in a direction from a left-upper position of the macro block to a right-lower position of the macro block, and sequentially receive the 4×4 blocks based on corresponding sequencing identifiers.

Further, the comparator may determine that the other small block, with a sequence identifier number 4, is simultaneously processed with the small block when a sequence identifier number of the small block is 2, that the other small block, with a sequence identifier number 5, is simultaneously processed with the small block when the sequence identifier number of the small block is 3, that the other small block, with a sequence identifier number 8, is simultaneously processed with the small block when a sequence identifier number of the small block is 7, that the other small block, with a sequence identifier number 12, is simultaneously processed with the small block when a sequence identifier number of the small block is 10, and/or that the other small block, with a sequence identifier number 13, is simultaneously processed with the small block when a sequence identifier number of the small block is 11.

The first processing unit and the second processing unit may calculate motion vector prediction values from average values of motion vectors of respective adjacent small blocks.

To achieve the above and/or additional aspects and advantages, embodiments of the present invention include a medium including computer readable code controlling the selecting of at least one small block and simultaneous performance of the motion vector prediction in the methods of the present application. Embodiments of the present invention may further include a medium including computer readable code controlling the motion vector information receiver, comparator, and first and second processing units of the motion vector predicting apparatuses of the present invention, to simultaneously perform motion vector prediction of the small block and the other block.

To achieve the above and/or additional aspects and advantages, embodiments of the present invention include a video compression method, including selecting a first and second small blocks of a macro block, such that respective motion vectors can be estimated using motion vector information of at least one decoded block adjacent to the first and/or second small blocks, and simultaneously performing motion vector predictions of the selected first and second small blocks. The selection of the first and second small blocks may be based on a zigzagged sequencing of small block selection from a left-upper position of the macro block to a right-lower position. In addition, the first and second small blocks may each be 4×4 blocks and the macro block may be made up of a plurality of 4×4 blocks.

Further, the macro block may be divided into sized blocks other than 4×4 blocks and motion vector prediction values may be calculated by presuming that the macro block is divided into 4×4 blocks.

Lastly, to achieve the above and/or additional aspects and advantages, embodiments of the present invention include a video compression method, including dividing a macro block into 16 small blocks, and simultaneously performing motion vector prediction of a first small block or the first small block and a second small block, wherein motion vector prediction values for all 16 small blocks of the macro block are generated in 11 operations.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 3A and 3B illustrate adjacent blocks that may be required for obtaining a motion vector of each block when a macro block is divided into 16 4×4 blocks, according to an embodiment of the present invention;

FIG. 4 illustrates a sequenced processing process of 4×4 blocks, according to an embodiment of the present invention;

DETAILED DESCRIPTION OF THE PREFERRED EMBODIMENTS

Figures 1, 2:
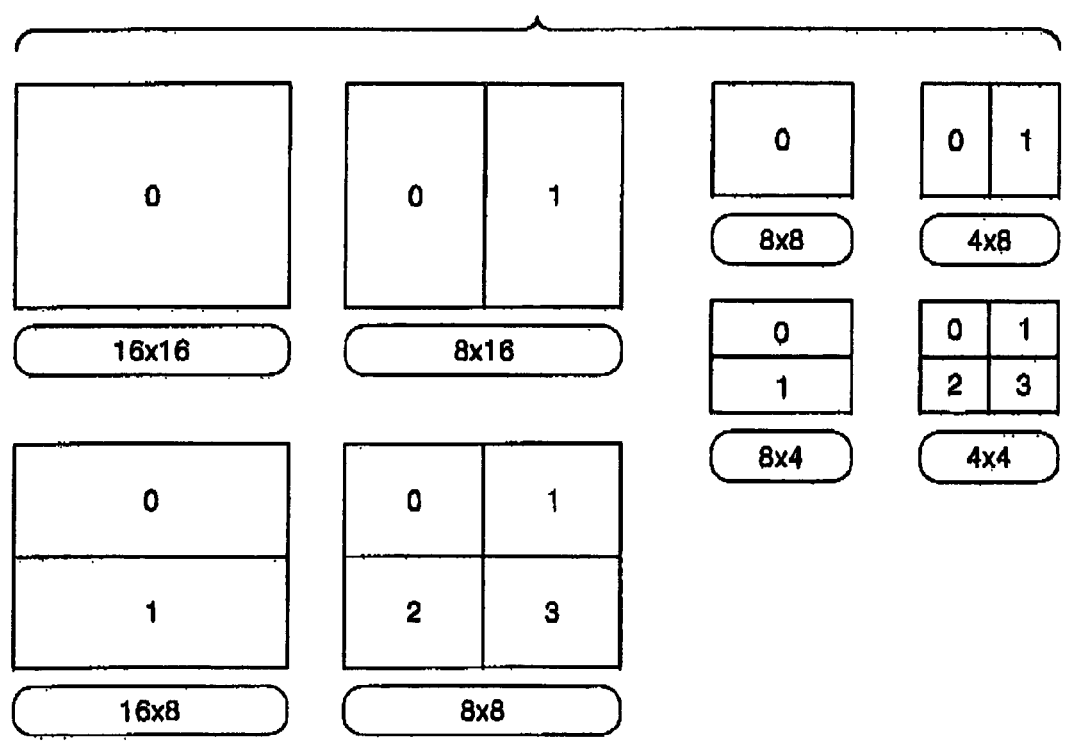
FIG. 1 illustrates a processing sequence for 4×4 blocks in a macro block made up of the 4×4 blocks.
FIG. 2 illustrates block types used for motion prediction in an H.264 standard.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a processing sequence for 4×4 blocks in a macro block made up of the 4×4 blocks. As illustrated in FIG. 1, when motion vectors of 4×4 blocks are obtained, since the 4×4 blocks are processed in a zigzag scanning sequence from a left-upper position to a right-lower position, the 4×4 blocks can be processed in a particular sequence. Referring to FIG. 1, the 4×4 blocks may be sequentially processed one by one.

FIG. 2 illustrates block types used for motion prediction in a H.264 video compression standard. As illustrated in FIG. 2, in the H.264 standard, a 16×16 macro block can be divided into 7 variable blocks, each block having a motion vector. In an inter prediction mode, of the H.264 standard, a macro block can be divided into 16×16, 8×16, 16×8, or 8×8 blocks, and an 8×8 block can be further divided into 8×8, 4×8, 8×4, or 4×4 blocks. The numbers illustrated in each block correspond to a processing sequence of the block.

FIGS. 3A and 3B illustrate adjacent blocks that may be required for obtaining a motion vector of each block when a macro block is divided into 16 4×4 blocks.

To obtain a motion vector of a current block T, in FIG. 3A, motion vector information of blocks A, B, and D may be required, and to obtain a motion vector of a next block T, in FIG. 3b, motion vector information of blocks A, B, C, and D may be required. To obtain the motion vector of the current block T, in FIG. 3a, a predicted motion vector (PMV) value is calculated using the motion vector information of the blocks A, B, and D. The PMV value can be obtained using a plurality of known methods, for example, the PMV value can be obtained according to a median value among the motion vectors of adjacent blocks, where the adjacent blocks are decoded blocks.

Adjacent blocks required for obtaining a motion vector of each block, with reference to block numbers shown in FIG. 1, can be identified as follows, in Table 1.

TABLE 1

| 4 × 4 block number | Required adjacent block numbers | 4 × 4 block number | Required adjacent block numbers |
| --- | --- | --- | --- |
| 0 | — | 8 | 2, 3, 6 |
| 1 | 0 | 9 | 2, 3, 6, 8 |
| 2 | 0, 1 | 10 | 8, 9 |
| 3 | 0, 1, 2 | 11 | 8, 9, 10 |
| 4 | 1 | 12 | 3, 6, 7, 9 |
| 5 | 4 | 13 | 6, 7, 12 |
| 6 | 1, 3, 4, 5 | 14 | 9, 11, 12, 13 |
| 7 | 4, 5, 6 | 15 | 12, 13, 14 |

Referring to Table 1, blocks 2 and 4, blocks 3 and 5, blocks 7 and 8, blocks 10 and 12, and blocks 11 and 13 can actually be simultaneously processed, respectively. For example, an adjacent block required for processing block 4 is block 1, and since information of block 1 is already known when block 2 was processed, block 4 can be simultaneously processed when block 2 is processed.

Likewise, an adjacent block required for processing block 5 is block 4, and since information of block 4 has been already known when block 3 was processed, block 5 can be simultaneously processed when block 3 is processed. Blocks 7 and 8 can be simultaneously processed similarly, as along with blocks 10 and 12 and blocks 11 and 13, as well.

According to the above described process, a sequential processing of the blocks is illustrated in FIG. 4.

FIG. 4 illustrates a processing process of 4×4 blocks. As illustrated in FIG. 4, 16 4×4 blocks can be processed by a total 11 operations, in a sequence illustrated in FIG. 5. Two blocks are simultaneously processed in the third operation, the fourth operation, the sixth operation, the eighth operation, and the ninth operation.

Figures 5, 6:
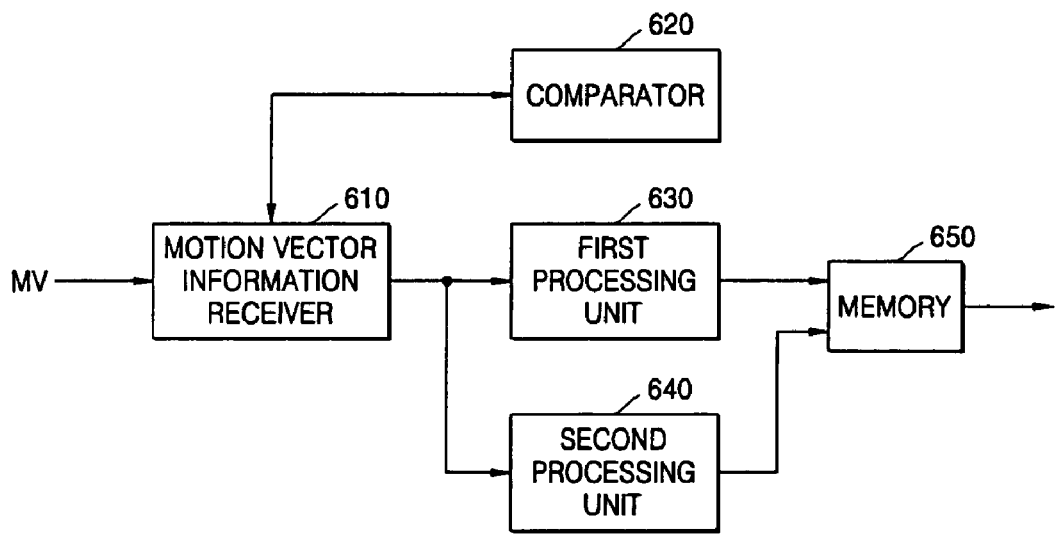
FIG. 5 illustrates a processing sequence of 4×4 blocks, according to an embodiment of the present invention.
FIG. 6 is a block diagram of a motion vector predicting apparatus of 4×4 blocks, according to an embodiment of the present invention.

FIG. 5 illustrates a processing sequence of 4×4 blocks. A processing sequence of 16 4×4 blocks is illustrated with numbering in each 4×4 block, including blocks that can be simultaneously processed, as illustrated with the same numbers. Referring to FIG. 5, two 4×4 blocks are simultaneously processed in the second block, the third block, the fifth block, the seventh block, and the eighth block.

FIG. 6 is a block diagram of a motion vector predicting apparatus of 4×4 blocks, according to an embodiment of the present invention.

As illustrated in FIG. 1, a motion vector predicting apparatus for 4×4 blocks includes a motion vector information receiver 610, a comparator 620, a first processing unit 630, a second processing unit 640, and a memory 650.

The motion vector information receiver 610 receives sequence information of a currently processing block and motion vector information of adjacent blocks. The comparator 620, if the currently processing block can be simultaneously processed with another small block, with reference to the sequence information, further processes the two small blocks simultaneously in the first processing unit 630 and the second processing unit 640, respectively. The first processing unit 630 and the second processing unit 640 calculate motion vector prediction values of currently processing blocks, respectively. A plurality of methods of calculating a motion vector prediction value can be used. For example, an average value of motion vectors of adjacent blocks can be used as the motion vector prediction value. The memory 650 stores motion vector prediction values and outputs the values after processing of all blocks is finished.

In embodiments of the present invention, even if a macro block is divided into other sized blocks, not into 4×4 blocks, to obtain motion vectors, motion vector prediction values can be calculated by the method described above by presuming that the macro block is divided into 4×4 blocks.

Embodiments of the present invention can also be embodied as computer readable code on a medium, e.g., a computer readable recording medium. The medium can be any data storage or transmission device that can store or transmit data which can be thereafter read by a computer system. Examples of the media include read-only memory (ROM), random-access memory (RAM), CD-ROMs, magnetic tapes, floppy disks, and optical data storage devices. The code can also be distributed over network coupled computer systems so that the computer readable code can be stored and executed in a distributed fashion.

As described above, according to embodiments of the present invention, video compression processing time can be reduced by reducing a process of predicting a motion vector. That is, by reducing a 16-operation process required for processing a macro block with 4×4 blocks into an 11-operation process, the processing time can be reduced approximately 31%, without using a complicated motion vector predicting apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motion vector predicting method predicting a motion vector, in a macro block divided into plural small blocks, for reducing a prediction processing time for plural motion vectors of the macroblock, the method comprising:
    selecting at least one small block from the macro block which a motion vector can be predicted using motion vector information of at least one adjacent decoded small block of the macro block; and
    using a computer to simultaneously perform a motion vector prediction of the selected at least one small block with a separate motion vector prediction of another small block of the macro block,
    wherein a motion vector of the other small block can be predicted using motion vector information of the at least one adjacent decoded small block.

2. The method of claim 1, wherein the at least one small block is selected from the macro block in a zigzag scanning sequence from a left-upper position of the macro block to a right-lower position of the macro block.

3. The method of claim 1, wherein the motion vector prediction of the at least one small block is a motion prediction operation of an inter prediction mode.

4. The method of claim 1, wherein the at least one small block is a 4×4block.

5. The method of claim 4, wherein the at least one small block is selected from the macro block in a zigzag scanning sequence from a left-upper position of the macro block to a right-lower position of the macro block.

6. A non-transitory computer readable recording medium storing computer readable code for causing a computer to execute controlling the selecting of the at least one small block of a macro block and simultaneous performance of the motion vector prediction of the plural small blocks of the macro block according to the method of claim 1.

7. A motion vector predicting apparatus predicting a motion vector, in a macroblock divided into plural small blocks, for reducing a prediction processing time for plural motion vectors of the macroblock, the apparatus comprising:
    a motion vector information receiver to receive sequence number information of at least one small block of the macro block and motion vector information of at least adjacent to small block of the macroblock to motion predict the at least one small block, wherein the motion vector information of the at least one adjacent small block results from a previous motion vector prediction of the at least one adjacent small block;
    a comparator to determine whether the small block is a small block that can be simultaneously processed with another small block, and to control the motion vector information receiver to further receive motion vector information of a small block of the macroblock adjacent to the other small block to motion predict the other small block, wherein the motion vector information of the small block adjacent to the other small block results from a previous motion vector prediction of the small block adjacent to the other small block;
    a first processing unit to perform motion vector prediction of the small block; and
    a second processing unit to simultaneously, based on a result of the determination, perform motion vector prediction of the other small block with the performing of a separate motion vector prediction of the small block by the first processing unit.

8. The apparatus of claim 7, further comprising:
memory to store motion vector prediction values of small blocks of the macro block and to output the stored motion vector prediction values after motion vector prediction of all small blocks of the macro block is completed.

9. The apparatus of claim 7, wherein the motion vector information receiver divides the macro block into predetermined sized small blocks, assigns a sequencing identifier to each of the predetermined sized small blocks, starting with an initial identifier, in a direction from a left-upper position of the macro block to a right-lower position of the macro block, and sequentially receives the predetermined sized small blocks based on corresponding sequencing identifiers.

10. The apparatus of claim 7, wherein the small block is a 4×4 block.

11. The apparatus of claim 10, wherein the motion vector information receiver divides the macro block into 16 4×4 blocks, assigns sequencing identifiers to 16 4×4 blocks, starting with an initial identifier, in a direction from a left-upper position of the macro block to a right-lower position of the macro block, and sequentially receives the 4×4 blocks based on corresponding sequencing identifiers.

12. The apparatus of claim 10, wherein the comparator determines that the other small block, with a sequence identifier number 4, is simultaneously processed with the small block when a sequence identifier number of the small block is 2, that the other small block, with a sequence identifier number 5, is simultaneously processed with the small block when the sequence identifier number of the small block is 3, that the other small block, with a sequence identifier number 8, is simultaneously processed with the small block when a sequence identifier number of the small block is 7, that the other small block, with a sequence identifier number 12, is simultaneously processed with the small block when a sequence identifier number of the small block is 10, and/or that the other small block, with a sequence identifier number 13, is simultaneously processed with the small block when a sequence identifier number of the small block is 11.

13. The apparatus of claim 7, wherein the first processing unit and the second processing unit calculate motion vector prediction values from average values of motion vectors of respective adjacent small blocks.

14. A non-transitory computer readable recording medium storing computer readable code for causing a computer to execute controlling the motion vector information receiver, comparator, and first and second processing units of the motion vector predicting apparatus of claim 7, to simultaneously perform motion vector prediction of a small block of a macro block and another block of the macro block.

15. A video compression method predicting a motion vector, in a macro block divided into plural small blocks, for reducing a prediction processing time for plural motion vectors of the macroblock the method comprising:
selecting first and second small blocks of a macro block, such that respective and separate motion vectors can be predicted for each of the first and second small blocks using motion vector information of at least one decoded block, of the macroblock adjacent to the first and/or second small blocks; and
simultaneously performing motion vector predictions of the selected first and second small blocks,
wherein, in the simultaneous performing of the motion vector prediction, motion vector prediction of at least one of the first and second small blocks includes different respective motion vector information of at least two decoded small blocks of the macroblock decoded at different times.

16. The method of claim 15, wherein the selection of the first and second small blocks is based on a zigzagged sequencing of small block selection from a left-upper position of the macro block to a right-lower position.

17. The method of claim 15, wherein the first and second small blocks are each 4×4 blocks and the macro block is made up of a plurality of 4×4 blocks.

18. The method of claim 15, wherein the macro block is divided into sized blocks other than 4×4 blocks and motion vector prediction values are calculated by presuming that the macro block is divided into 4×4 blocks.

* * * * *